No. 621,994. Patented Mar. 28, 1899.
J. & A. DEY.
WORKMAN'S TIME RECORDER.
(Application filed Sept. 19, 1898.)

(No Model.) 7 Sheets—Sheet 1.

Witnesses. Inventors.
A. D. Allen Alexander Dey
H. M. Seamans John Dey
By Mark W. Dewey
Their Attorney.

Fig. 1.

No. 621,994. Patented Mar. 28, 1899.
J. & A. DEY.
WORKMAN'S TIME RECORDER.
(Application filed Sept. 19, 1898.)
(No Model.) 7 Sheets—Sheet 2.

Fig. 2.

Witnesses.
A. D. Allen
H. M. Seamans

Inventors.
Alexander Dey,
John Dey,
By Mark W. Dewey
their Attorney.

No. 621,994. Patented Mar. 28, 1899.
J. & A. DEY.
WORKMAN'S TIME RECORDER.
(Application filed Sept. 19, 1898.)
(No Model.) 7 Sheets—Sheet 3.

Witnesses.
A. D. Allen
H. M. Seamans

Fig. 3.

Inventors.
Alexander Dey
John Dey
By Mark W. Dewey
their Attorney.

No. 621,994. Patented Mar. 28, 1899.
J. & A. DEY.
WORKMAN'S TIME RECORDER.
(Application filed Sept. 19, 1898.)
(No Model.) 7 Sheets—Sheet 4.

Witnesses
A. D. Allen
H. M. Seamans

Inventors,
Alexander Dey
John Dey
By Mark W. Dewey
their Attorney.

No. 621,994.  
J. & A. DEY.  
WORKMAN'S TIME RECORDER.  
(Application filed Sept. 19, 1898.)  
Patented Mar. 28, 1899.

(No Model.) 7 Sheets—Sheet 5.

Witnesses  
A. D. Allen  
H. M. Seamans

Inventors.  
Alexander Dey  
John Dey  
By Mark W. Dewey  
Their Attorney.

No. 621,994. Patented Mar. 28, 1899.
J. & A. DEY.
WORKMAN'S TIME RECORDER.
(Application filed Sept. 19, 1898.)
(No Model.) 7 Sheets—Sheet 7.

Witnesses.
A. D. Allen
H. M. Seamans

Inventors,
Alexander Dey,
John Dey,
By Mark W. Dewey
their Attorney.

UNITED STATES PATENT OFFICE.

JOHN DEY, OF SYRACUSE, NEW YORK, AND ALEXANDER DEY, OF GLASGOW, SCOTLAND.

WORKMAN'S TIME-RECORDER.

SPECIFICATION forming part of Letters Patent No. 621,994, dated March 28, 1899.

Application filed September 19, 1898. Serial No. 691,280. (No model.)

*To all whom it may concern:*

Be it known that we, JOHN DEY, of Syracuse, in the county of Onondaga, in the State of New York, and ALEXANDER DEY, of Glasgow, in the county of Lanark, Scotland, have invented new and useful Improvements in Workmen's Time-Recorders, of which the following, taken in connection with the accompanying drawings, is a full, clear, and exact description.

Our invention relates to the class of time-recorders which are employed in factories and other establishments having many employees, who are required to record their times of entering and leaving the establishment.

The invention relates more particularly to the style of workman's time-recorder known as the "Dey workman's time-recorder," and the invention resembles in some respects the apparatus shown in United States Patents No. 522,784, dated July 10, 1894, and No. 524,102, dated August 7, 1894; and it consists in certain improvements of the construction and combinations of the parts of the apparatus, as hereinafter described, and specifically set forth in the claims.

In the drawings hereto annexed and forming a part of our specification.

Referring specifically to the drawings, A represents the inclosing case of the recording apparatus. In the upper front portion of the case is located the clock mechanism B, which may be of any suitable and well-known type.

Figure 1:
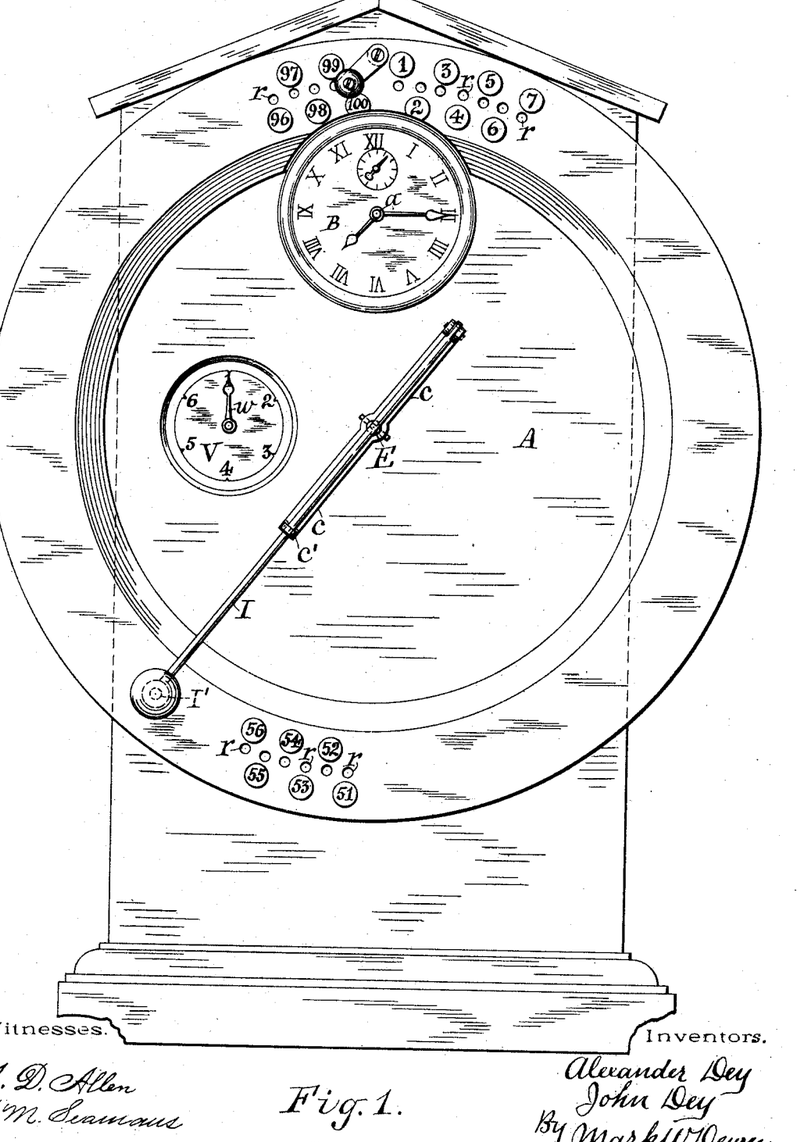
Figure 1 is a front elevation of the time-recorder.
Figure 2:
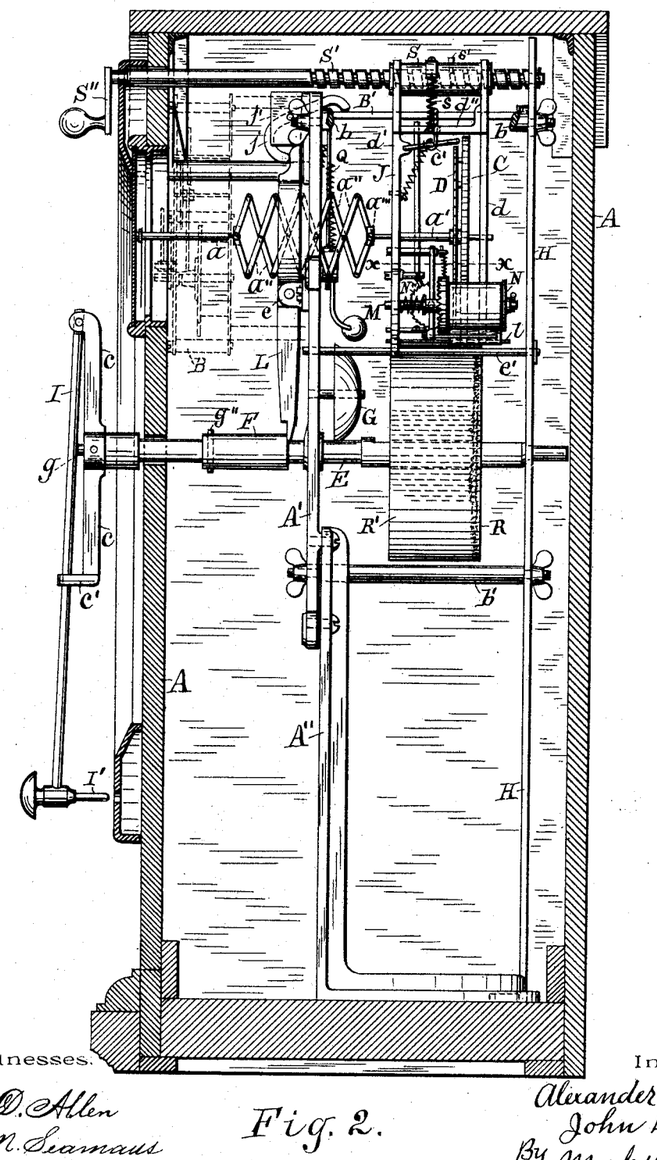
Fig. 2 is a side elevation of the mechanism of said recorder, the case being shown in section.
Figure 3:
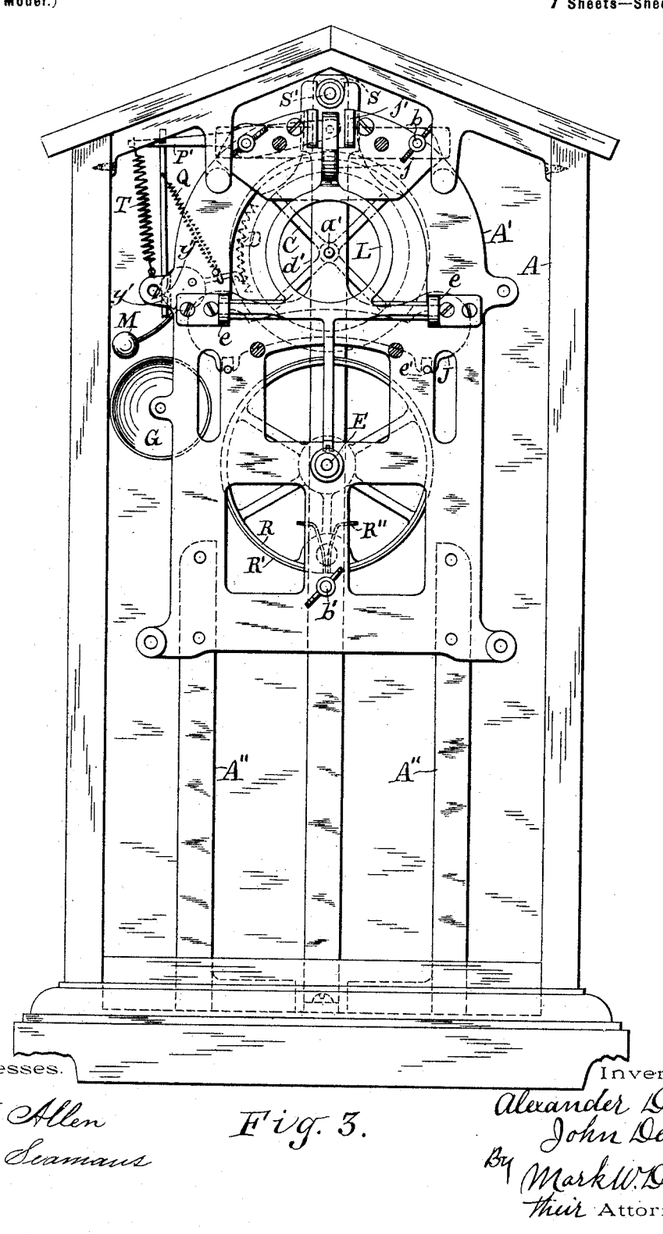
Fig. 3 is a front elevation of the mechanism, the front of the case and the clock being removed.
Figure 4:
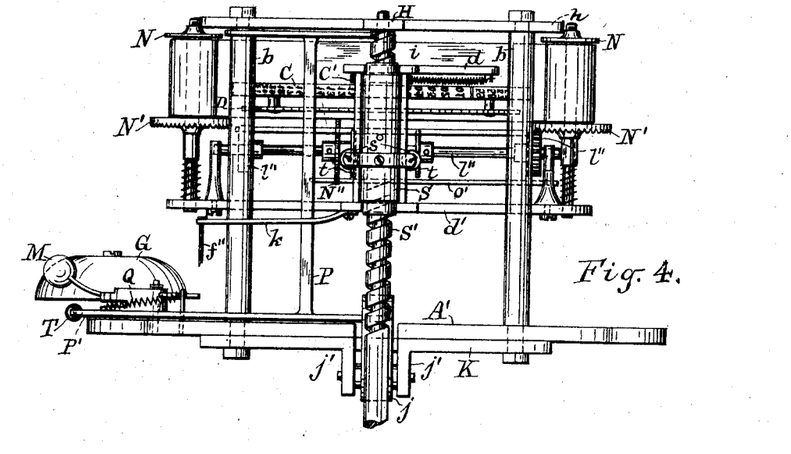
Fig. 4 is an enlarged top plan view of the recording mechanism.
Figure 5:
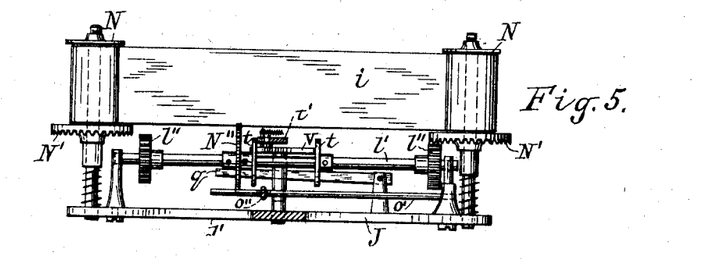
Fig. 5 is a transverse sectional view of the mechanism for operating the inked ribbon, taken on line $xx$ of Fig. 2.
Figure 6:
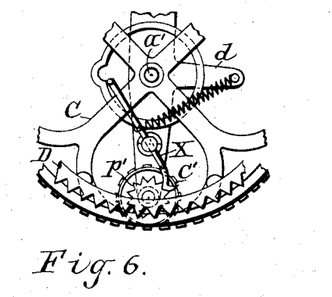
Fig. 6 is a detail view of the connection of the minute and hour wheels.
Figure 7:
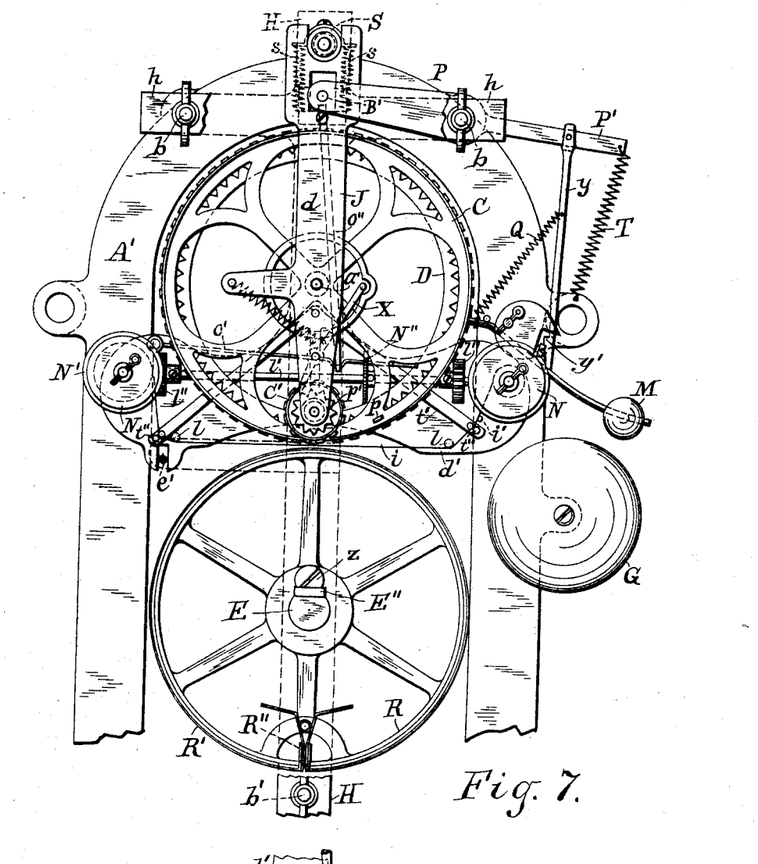
Fig. 7 is a rear side elevation of the recording mechanism.
Figure 8:
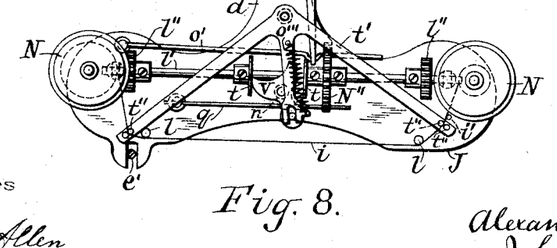
Fig. 8 is a detail view of the mechanism for moving and for reversing the movement of the inked ribbon.
Figure 12:
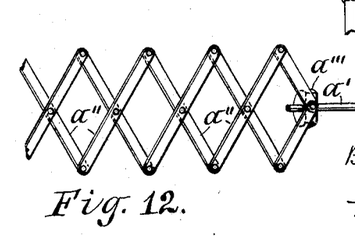
Fig. 12 shows a perspective view of the flexible extensible shaft for connecting the shaft of the minute-wheel of the clock with the shaft of the minute-wheel of the recording mechanism, as shown in Fig. 2 of the drawings.
Figure 13:
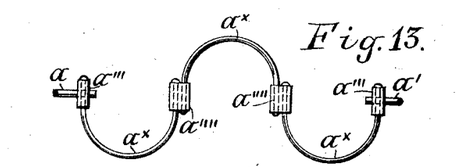
Figs. 13 and 14 are side and top plan views, respectively, of a modified form of flexible extensible shaft.
Figure 14:
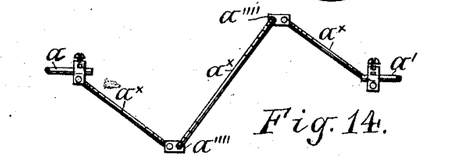

$a$ is the minute-hand spindle, which is utilized for actuating the type-wheel C, which prints the minutes of the hours during which the recordings are made, the hours being printed by a smaller wheel C', which receives motion from the minute-wheel C, as hereinafter described. Said minute-wheel C is fixed upon a shaft $a'$, which is in line with the spindle $a$ and is flexibly connected therewith, preferably by a shaft formed of thin strips of metal $a''$, crossing each other and pivoted together at their ends and intermediate their length in a well-known manner to permit the ends of the shaft to approach or recede from each other easily, as shown in Figs. 2 and 12 of the drawings. The ends of this jointed extensible shaft are provided with perforated blocks $a'''$, which are secured upon the said spindle and minute-wheel shaft by screws. We do not desire to be limited to this particular form of extensible shaft, as any suitable connection may be used that combines the proper degree of flexibility with that of extensibility. In this connection we will refer to another form of extensible connection. (Shown in Figs. 13 and 14 of the drawings.) This connection is formed by curved wires $a^\times$, having their ends passing through and adapted to turn in small blocks $a''''$ between the wires and in the perforated blocks $a'''$, mounted on the ends of the spindles $a$ and $a'$. This form of extensible shaft may be provided with any suitable number of blocks or joints, and, being simple and light, will accomplish the purpose as well as the other construction. The extensible connection between the shafts is made flexible or so that it may be easily twisted slightly and then return to its normal position to allow the type-wheel C to be turned slightly in one direction or the other to print the number of minutes properly upon the record-receiving piece or band R' when the minute-hand of the clock is not exactly between two minutes. Said flexible connection also allows the type-wheel to be held at rest while the impression is being made. To temporarily arrest the movement of said minute-wheel for the purpose aforesaid, we mount on the front side of said wheel another wheel D, which has its periphery formed with V-shaped notches, the number of notches corresponding to the number of minutes on the minute-wheel. A detent D', thrown into one of the notches, as hereinafter described, arrests the wheel, as aforesaid.

Immediately back of the clock mechanism B is a vertical metal plate or frame A', secured upon the upper ends of a pair of posts A," provided with feet secured to the bottom of the case. From the upper part of this frame project rearward two arms $b$ $b$, to which are secured the ends of a horizontal cross-bar $h$ of a vertical post H, extending from the bottom of the case near the rear side thereof. Another arm or bar $b'$ extends from the said plate A' to the post in a horizontal direction below the drum R, carrying the record-band.

The minute or type wheel has the numbers from "0" to "60" projecting from its periphery and is designed to print the minutes of the time of recording. On a vertical plate $d$, forming the rear plate of the carriage J of the type-wheels and in which one end of the shaft $a'$ of the minute-wheel turns, is mounted a second and smaller type-wheel C', which is the hour-printing wheel, having the numbers "1" to "12" projecting from its periphery. This latter wheel receives one-twelfth of a revolution at the end of each complete revolution of the minute-wheel by means of devices hereinafter referred to.

Beneath the minute-wheel C and hour-wheel C' is the impression-roller R, mounted rigidly but adjustably movable on a shaft E, which is parallel with the shaft of the minute-wheel and is journaled in the plate A' and post H and extended forward through the front of the case A to the operating-crank of the machine. The impression roller or drum R is revolved by means of the crank to the desired position, and then the type-wheels, which are mounted in a cage or carriage J, are depressed to make their impressions on the band R' of paper, mounted on the periphery of the roller and secured thereto by the ends of the band passing through a slot in the roller and fastened to a clamp R" inside of the roller. The drum having neither vertical nor horizontal motion tends to greater perfection in printing.

At the end of each working-day the paper containing the recordings is removed from the roller and a new strip is placed upon the roller when the machine is a daily machine. When the machine is a weekly, the record-strip and its roller are made wider to accommodate a greater number of spaces for recordings—as, for instance, thirty-six side by side—in which case the record-strip is removed from its roller at the end of each week. The roller and record-strip and corresponding mechanism may be extended for recording and receiving the records for any number of days desired without departing from our invention. It will be only necessary to provide means for moving the carriage containing the type-wheels and inked-ribbon devices a greater distance, depending upon the length of the roller carrying the record-band.

Figures 10, 15:
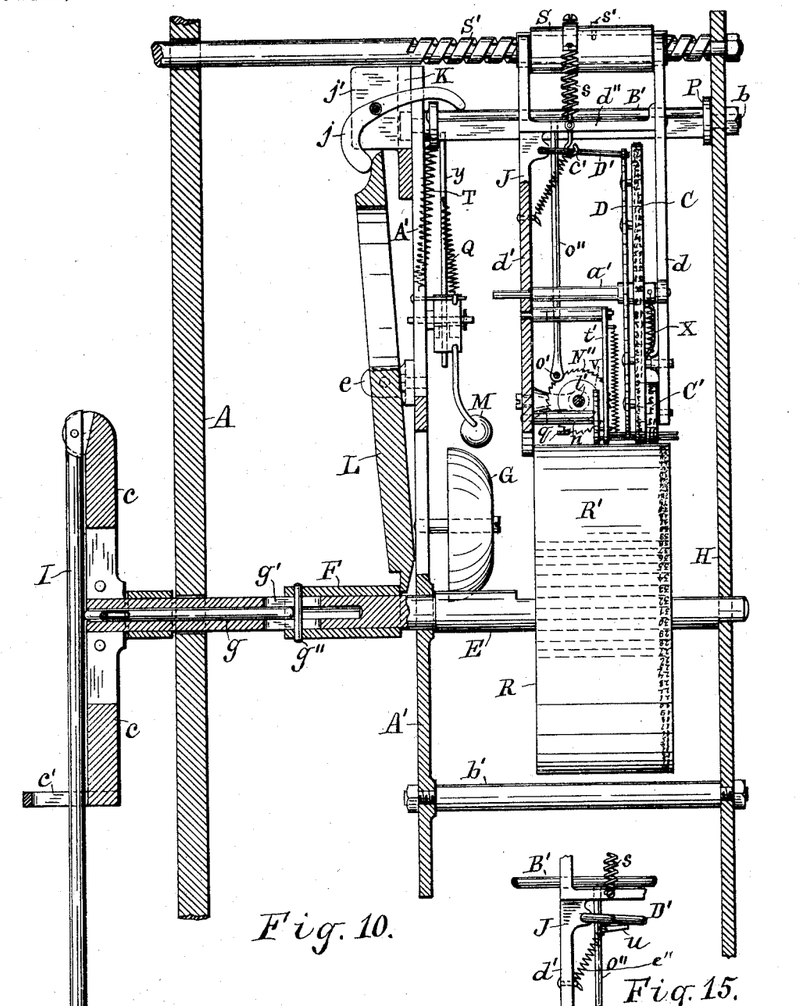
Fig. 10 shows the same when in its operative position.
Fig. 15 is a detail view of a modification.
Figure 11:
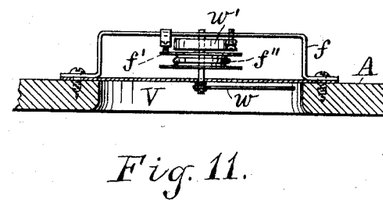
Fig. 11 is a sectional view of the dial and mechanism for indicating the position of the carriage supporting the type-wheels.

The operating-crank consists of two arms $c$ $c$, extending radially in opposite directions. To the free end of one of said arms is hinged the lever I, which extends with its free end beyond the end of the other arm, which latter terminates with a loop $c'$, through which the aforesaid lever passes. By means of said lever rotary motion can be imparted to the shaft E, and in order to depress the carriage with its type-wheels, which is held supported in a raised position by a pair of coiled springs $s$ $s$ on opposite sides of a sleeve S, provided with a pin $s'$, mounted on a horizontal threaded shaft S', extending from and turning in the upper end of the vertical post H near the rear side of the case and passing over the frame A' and through the front of the case A, a frame P is journaled on the left-hand arm $b$, and one of its side bars, consisting of a rod B', which is parallel with and directly below the threaded rotary bar S', is engaged by one end of a curved lever $j$, which is pivoted intermediate its length between lugs $j'$, projecting forward from a recessed plate K, secured to the upper end of the plate A'. Secured to the front side of the plate A', midway between the curved lever $j$ and the crank-shaft, are lugs $e$ $e$, in which are pivoted the ends of a horizontal bar which is integral with a lever L, which is engaged by one end of the said curved lever and extends downward to the crank or operating shaft E. The crank-shaft is hollow at the end extending through the case, and in the interior thereof is the longitudinally-movable plunger $g$, which abuts with its outer end against the lever I. On the exterior of the shaft is a longitudinally-movable collar F, which is connected to the plunger $g$ by a pin $g''$, passing through a longitudinal slot $g'$ in the shaft. The free end of the lever L bears on the rear end of the collar F. The result is that by pressing the free end of the lever I toward the case A the plunger $g$ is pushed inward and carries with it the collar F. This movement of the collar causes the lever L to oscillate in its bearings and in turn oscillate the curved lever $j$, engaging its upper end, and depress the inner end of the pivoted frame P, which in its downward movement strikes the carriage J and depresses it, causing the peripheries of the type-wheels C and C' to make impression on the paper band R', mounted on the roller R. The lever $j$ acts directly upon the rod B' of the pivoted frame P. The carriage is moved vertically by depressing the rod B', which lies directly below and parallel with the threaded shaft S'. The said rod when descending strikes two points on the carriage simultaneously, which points are directly below the points on the carriage which engage the ends and shoulders of the tube which moves longitudinally on the threaded shaft S'. The upper end of the carriage J is bifurcated to receive the tube S and slides upon the ends of the tube when depressed or moved vertically. By this means the carriage is kept continually in a vertical position. The extended movable rod B' permits of the carriage moving horizontally and insures a uniform pressure in every position of the carriage. It will be noticed that the springs $s\ s$, supporting the carriage, are arranged to one side of the center of the cross-bar $d''$ of the carriage. This is done to balance the carriage. When the carriage is being depressed, the pressure on the rod $o$, that operates the pawl $o'$ of the ratchet-wheel $N''$, tends to tilt the carriage to one side, and this is obviated by connecting the springs $s\ s$ slightly forward of the center of the said cross-bar. The springs $s\ s$ are of sufficient strength to prevent the depression of the carriage J before the ratchet-wheel $N''$ and detent D' have moved, this being necessary for clear and accurate printing. The shoulders near the ends of the tube or sleeve S securely hold the carriage from lateral movement upon the sleeve, and the pin $s'$, passing through the sleeve, enters the spiral groove in the threaded shaft and prevents longitudinal movement of the sleeve, except when the threaded shaft is rotated. In order to produce the impressions of the said type-wheels upon the paper band R', the inked ribbon $i$ is interposed between said wheels and paper. The ribbon is wound at opposite ends upon spools N N, pivoted to suitable supports on the lower end of the carriage, and by means of guides $l\ l$ the ribbon is held normally out of contact with the paper and peripheries of the type-wheels. The said spools are turned automatically to shift the ribbon longitudinally at each time of recording. A pinion N' forms the inner end of each spool. Between the two pinions is a horizontal shaft $l'$, which is supported longitudinally movable in suitable bearings secured upon the inner face of one of the plates of the carriage J and has secured to its ends pinions $l''$, which are placed a proper distance apart, so that by shifting the shaft $l'$ longitudinally one of said pinions is thrown out of engagement with the adjacent pinion N', while the other pinion $l''$ is thrown into engagement with the pinion N' adjacent thereto. This shaft $l'$ receives intermittent rotary motion by means of a ratchet-wheel $N''$, secured to said shaft, with which wheel engages a pawl $o'$, formed by a straight wire extending substantially in a horizontal direction from a projection on the front plate $d'$ of the carriage and substantially parallel with the shaft $l'$. The pawl $o'$ is extended sufficiently to permit the movement of the ratchet-wheel and shaft without disengaging the wheel and is connected to the lower end of the rod $o''$, extending substantially vertically through the cross-bar $d''$ of the carriage to a point immediately beneath the rod B' of the oscillating frame P, which depresses the carriage. The said vertical rod is guided by the cross-bar $d''$ and is kept in place on the pawl $o'$ by a slight depression therein. An extended detent $q$ also engages the ratchet-wheel to prevent back motion. The motion transmitted to the shaft $l'$ causes one of the pinions $l''$ to turn one of the spools a distance equal to the space between two of the teeth on the ratchet-wheel $N''$. The pinions $l''$ are arranged to engage the pinions N' at diametrically opposite points, and consequently each of said pinions imparts to the adjacent spool N motion in opposite direction from that imparted to the other spool by the adjacent pinion when engaged. Hence by shifting the shaft $l'$ longitudinally the motion of the inked ribbon is reversed. The rod $o''$ may also be utilized for temporarily stopping the rotary motion of the time-printing wheels C and C' during the operation of recording the time. This stoppage is effected by the engagement of a projection $u$ on the rod $o''$ with an irregular detent D', fulcrumed in the carriage just below the cross-bar $d''$ and extending over the wheel D, having the V-shaped notches. The projection $u$ on the rod bears upon the lower side of the detent and when raised lifts the lever out of the path of the notched wheel; but when the rod is lowered, as just prior to the depression of the carriage J and its printing-wheels, the lever is permitted to descend, assisted by a coiled spring $c''$, which connects it with the frame of the carriage, as shown in Fig. 15 of the drawings. The same result is accomplished by connecting the detent for the notched wheel by a link $c'$ with the horizontal rod of the oscillating frame. The said link passes through an aperture in the cross-bar of the carriage. To effect the aforesaid longitudinal movement of the shaft $l'$, and thereby reverse the motions of the spools N N at the time when the ribbon has been run its limit from one of the spools, we pivot to a post $n$ a three-armed lever $v$. Two arms of this lever extend upward from the pivot and are between two collars $t\ t$, fastened to the shaft $l'$. The third arm of the lever extends downward and has a pin projecting from its face. Above said shaft is pivoted a yoke $t'$, which has also three arms, one of which extends downward and is slotted longitudinally at its free end and straddles the aforesaid pin on the lever $v$. The other two arms extend toward the two spools N N and are provided with guides $t''$, through which the inked ribbon $i$ passes. To this ribbon, near each end thereof, is fastened a barrier $i'$, which cannot pass the guide $t''$, and in the passage of the end portion of the ribbon from the spool the contact of the barrier $i$ with the guide $t''$ tilts the yoke $t'$ and causes the same to swing the lever $v$ to one side by means of the downwardly-extending arm of the yoke. In said movement of the lever it strikes one of the collars $t$ on the shaft $l'$, and thereby shifts the same longitudinally and causes one pinion $l''$ to be thrown out of gear with one of the spools N while throwing the other pinion $l''$ in gear with the adjacent spool, and thus the motion of the ribbon $i$ is reversed. To carry the lever $v$ past the center and partially lock the yoke and lever in their position, the lower end of said lever is connected by a spring $o'''$ to the yoke near the pivot thereof.

The above-described mechanism relating to the operation of the inked ribbon has been partly set forth and claimed in earlier patents of ours for time-recorders.

The front plate of the case A is provided with an annular row of sockets $r$ $r$, arranged concentric to the shaft E, and from the free end of the lever I projects a pin I', adapted to enter said sockets. These sockets are numbered consecutively, and each person who is required to use the recorder must adopt one of said numbers to identify said person from all others using the same recorder.

In recording the time of entering and leaving the place of business each employee must turn the lever I so as to bring the pin I opposite the number by which said employee is identified. Then by pushing the lever toward the case A the plunger $g$ is actuated to arrest the movement of the minute-wheel C and depress the carriage J, with its printing-wheels C and C', to print the time upon the paper mounted on the impression-roller R. Said paper is so arranged on the roller as to bring directly under the printing-wheel C that number marked upon the paper which corresponds to the number of the socket $r$, which is entered by the pin I' in the operation of the lever I.

In order to allow the recordings during different periods of the day to be made distinctly upon the band of paper R', we make the latter and its carrying-roller R of sufficient width to allow the different times of recording to be printed in rows opposite the respective numbers marked on the paper, and to allow the type-wheels to be shifted laterally, and thus permit the printing to be done at different points in the width of the paper, we mount the type-wheels C and C' and the inked-ribbon mechanism on a carriage, as before mentioned, and this carriage is moved on a guide-rod $e'$ and on the threaded shaft S', which is rotated by a small crank S'' on one of its ends projecting through the front of the case.

To indicate clearly the position of the carriage with respect to the roller, we place a dial V in the front of the case A to the left of the operating-shaft and arrange numerals on the dial to indicate the different positions of the carriage, there being preferably six positions for a daily machine and usually thirty-six for a weekly. Figure "1" on the said carriage-dial indicates the point to which the hand should point when the employees enter in the morning. "2" indicates the point to which the hand should extend when the employees make their recordings at noon; "3," when they return in the afternoon; "4," when they pass out, say, at 5 or 6 o'clock p. m.; and figures "5" and "6" are for the coming in and going out, respectively, when on extra time. The hand $w$ for the said dial is mounted on a spindle provided with a spring $w'$, which is secured by one end to the yoke $f$, in which the spindle turns. The spindle is provided with a grooved pulley $f'$, and a cord $f''$ connects the pulley with an arm $k$, projecting to the left from the upper part of the carriage, the cord passing over a small grooved pulley $k'$, secured to the inner side of the front of the case. When the carriage is moved toward the front of the case, the hand on the dial V moves in the direction of the hands of a clock.

The hour-wheel C' has the numbers from "1" to "12" projecting from the periphery and receives one-twelfth of a revolution at the end of each complete revolution of the minute-wheel C. This is effected by a pin $p$, projecting from the minute-wheel and during the rotation of the latter engaging a ratchet-wheel $p'$, fastened to the side of the hour-wheel, which is journaled on a stud-pin secured to the rear plate $d$ of the carriage. A detent X, attached to said plate $d$ and engaging the teeth of the ratchet-wheel, prevents backward or undue movement of the hour-wheel.

We do not desire to be limited to the particular form of roller for carrying the record-band R', inasmuch as any other suitable and well-known means may be employed to support and move the said band.

The bell G is secured upon the inner side of the plate A', and the bell-hammer M is pivoted to the said plate above the bell. Said hammer is operated by a rod $y$, extending downward from the arm P' on the oscillating frame P, to which the coiled spring T is attached, which returns the said frame to its normal position. Said bell-rod is provided with a catch $y'$ on its lower end, which engages a projection $y''$ on the bell-hammer arm when the former is raised, and while rising the hammer is released, causing it to fall and strike the bell, its fall being assisted by the spring Q.

Figure 9:
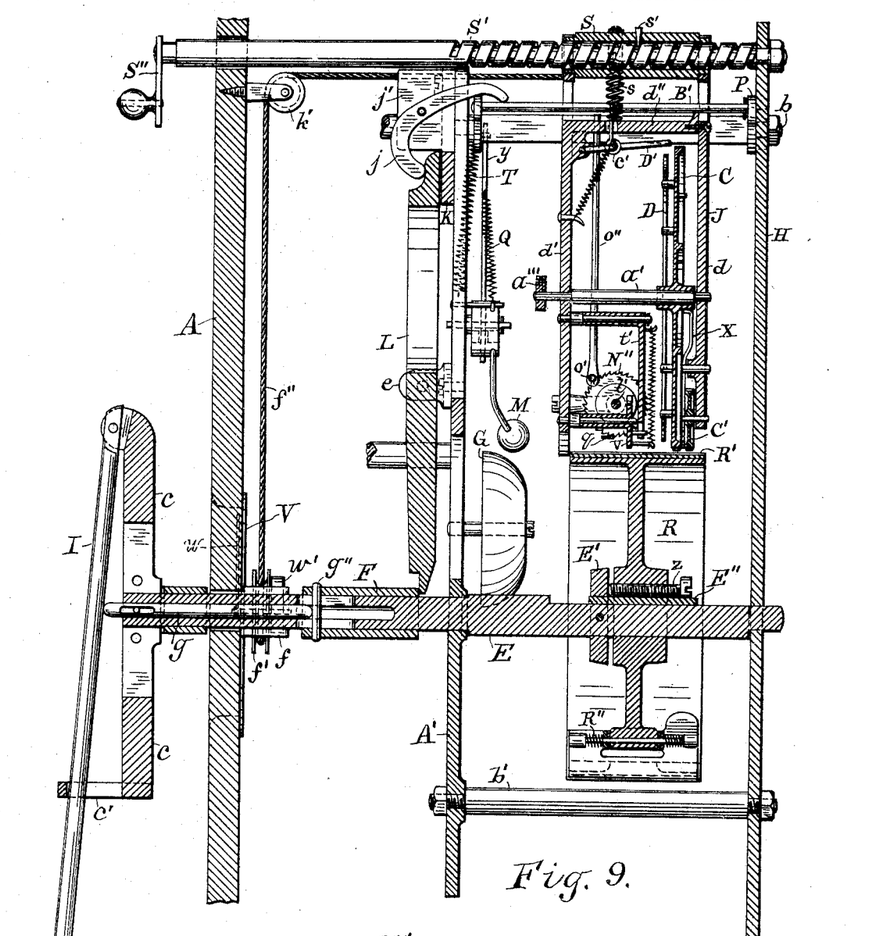
Fig. 9 is a vertical central transverse view of the recording mechanism when in its normal position.

The roller R is secured adjustably longitudinally on the shaft E, as shown in Fig. 9 of the drawings, by means of a screw $z$, passing through the hub of the roller and impinging upon the face of a collar E', rigidly fixed to the shaft near the hub, and a flat piece E'', slightly wedge-shaped between the flat side of the shaft and the flat side of the head of the screw. This wedge-shaped piece not only prevents the roller from turning on the shaft, but it prevents the screw from turning. To adjust the roller on the shaft, the wedge must be removed before the screw $z$ can be turned.

Having described our invention, what we claim as new, and desire to secure by Letters Patent, is—

1. In a workman's time-recorder, the combination with the clock, and the support for the record-receiving piece, of a carriage above the receiving-piece supporting the type-wheels and adapted to move transversely across the said piece, and means to depress the carriage at different times during its movement, as set forth.

2. In a workman's time-recorder, the combination with the clock, the support for the record-receiving piece, and means for revolving said support, of a carriage above the receiving-piece supporting the type-wheels and adapted to move transversely across the said piece, and means to depress the carriage at different times during its movement, as set forth.

3. In a workman's time-recorder, the combination with the stationary clock mechanism, a roller supporting the record-receiving band, and means for revolving the roller, of a carriage above the receiving-piece supporting the type-wheels and adapted to move transversely across the said piece, and means to depress the carriage at different times during its movement, as set forth.

4. In a workman's time-recorder, the combination with the stationary clock, a roller supporting the record-receiving band, a shaft for the roller, means for adjusting the roller longitudinally on the shaft, and means for turning the roller, of a carriage above the receiving-piece supporting the type-wheels and adapted to move transversely across the said piece, and means to depress the carriage at different times during its movement, as set forth.

5. In a workman's time-recorder, the combination with the stationary clock, and a revoluble support for the record-receiving piece, of a carriage movable toward and from the clock in a horizontal direction across said record-piece, time-printing wheels mounted upon the carriage, said wheels being yieldingly connected with the spindle of the minute-wheel of the clock, and suitable means to move the carriage toward and from the clock and toward and from the record-piece, as set forth.

6. In a workman's time-recorder, the combination with the stationary clock in the front part of the case, and a movable support for the record-receiving piece, of a carriage supporting time-printing wheels at the rear of the clock, the shaft of the minute-time-printing wheel being substantially in line with the spindle of the minute-hand of the clock, a flexible extensible connection between the said shaft and spindle, a rod having a spiral groove therein to move the carriage toward and from the clock, a guide for the carriage, and means operated independently of the said rod for moving the carriage toward and from the movable support for the record-receiving piece, as set forth.

7. In a workman's time-recorder, the combination with the stationary clock in the front part of the case, and a movable support for the record-receiving piece, of a carriage supporting time-printing wheels at the rear of the clock, the shaft of the minute-time-printing wheel being substantially in line with the spindle of the minute-hand of the clock, an extensible connection between the said shaft and the spindle consisting of a series of flexible pieces jointed together, a rod having a spiral groove therein to move the carriage toward and from the clock, a guide for the carriage, and means operated independently of the said rod for moving the carriage toward and from the movable support for the record-receiving piece, as set forth.

8. In a workman's time-recorder, the combination with the stationary clock in the front part of the case, and a movable support for the record-receiving piece, of a carriage supporting time-printing wheels at the rear of the clock, the shaft of the minute-time-printing wheel being substantially in line with the spindle of the minute-hand of the clock, a laterally-yielding and extensible connection between the said shaft and the spindle consisting of a series of thin bars crossing each other and pivoted together at their centers and at their extremities, a rod having a spiral groove therein to move the carriage toward and from the clock, a guide for the carriage, and means operated independently of the said rod for moving the carriage toward and from the movable support for the record-receiving piece, as set forth.

9. In a workman's time-recorder, the combination with the stationary clock in the front part of the case, and a movable support for the record-receiving piece, of a carriage-frame supporting time-printing wheels at the rear of the clock, a flexible extensible connection between the minute-printing-wheel shaft and the minute-hand spindle, a horizontal rod having a spiral groove therein and adapted to move the carriage, a pair of springs supporting the carriage from the said horizontal rod, a guide for the lower part of the carriage-frame, and means for moving the carriage against the action of the said springs toward the record-receiving piece, as set forth.

10. In a workman's time-recorder, the combination with the stationary clock in the front part of the case, and a movable support for the record-receiving piece, of a carriage-frame supporting time-printing wheels at the rear of the clock, a flexible extensible connection between the minute-printing-wheel shaft and the minute-hand spindle, a horizontal rod having a spiral groove therein, a tube on said grooved rod having shoulders near its ends and a pin entering the groove, said shoulders on the ends of the tube engaging the bifurcated upper ends of plates forming part of the carriage-frame, projections on opposite sides of the tube, a cross-bar of the carriage-frame below the tube and extending parallel thereto, coiled springs between the said projections and the sides of the cross-bar to one side of the center of the latter to support the carriage, a guide for the lower part of the carriage-frame, means for turning the said grooved rod, and means for moving the carriage against the action of the pair of springs toward the record-receiving piece, as set forth.

11. In a workman's time-recorder, the combination with the stationary clock in the front part of the case, of the carriage for the time-printing wheels back of the clock, an extensible connection between a clock-spindle and a shaft of one of the time-printing wheels, a threaded rod to move the carriage toward and from the clock, a revoluble support below the time-printing wheels, a stationary vertical plate between the clock and the carriage, a support at the rear of the carriage, horizontal bars extending parallel to each other between the said plate and support, an oscillating frame fulcrumed on one of said bars, a spring connecting the oscillating frame with the plate, a bar of the frame parallel to and below the threaded rod and adapted to engage and depress the carriage, and means to operate the said oscillating frame, substantially as described and shown.

12. In a workman's time-recorder, the combination with the stationary clock in the front part of the case, of the carriage for the time-printing wheels back of the clock, an extensible connection between a clock-spindle and a shaft of one of the time-printing wheels, a threaded rod to move the carriage toward and from the clock, a revoluble support below the time-printing wheels, a stationary vertical plate between the clock and the carriage, a support at the rear of the carriage, horizontal bars extending parallel to each other between the said plate and support, an oscillating frame fulcrumed on one of said bars, a spring connecting the oscillating frame with the plate, a bar of the frame parallel to and below the threaded rod and adapted to engage and depress the carriage, a vertical lever pivoted upon the vertical plate, a curved lever engaging one end of the vertical lever and the oscillating frame, and means to operate the vertical lever, substantially as described and shown.

13. In a workman's time-recorder, the combination with the clock, of the carriage back of the clock and movable toward and from the same, the stationary vertical plate between the clock and the carriage, the stationary support back of the carriage, a bar between the vertical plate and said support, an oscillating frame fulcrumed on the said bar and provided with a spring, the revoluble support for the record-band, the shaft for the support extending through the front of the case, a lever carried on the end of the shaft, a longitudinally-movable collar on the shaft operated by the lever, a vertical lever pivoted in lugs projecting from the said vertical plate and engaging the said collar, and a small curved lever pivoted at the upper part of the vertical plate to connect the vertical lever with the oscillating frame, substantially as described and shown.

14. In a workman's time-recorder, the combination with the clock, of the carriage back of the clock and movable toward and from the same, the stationary vertical plate between the clock and the carriage, the stationary support back of the carriage, a bar between the vertical plate and said support, an oscillating frame fulcrumed on the said bar and provided with a spring, the revoluble support for the record-band, the shaft for the support extending through the front of the case, a lever carried on the end of the shaft, a longitudinally-movable collar on the shaft, a pin passing through the said collar and a slot in the shaft, a plunger movable longitudinally in the hollow end of the shaft engaging the said pin and operated by the lever on the end of the shaft, a vertical lever pivoted in lugs projecting from the said vertical plate and engaging the said collar, and a small curved lever pivoted at the upper part of the vertical plate to connect the vertical lever with the oscillating frame, substantially as described and shown.

15. In a workman's time-recorder, the combination with the revoluble impression-roller, of a lever to turn said roller, a time-printing wheel movable across said impression-roller, and means to move the said printing-wheel toward the impression-roller, as set forth.

16. In a workman's time-recorder, the combination with a revoluble impression-roller, of a horizontal shaft secured rigidly to the roller, a lever to turn said shaft, a time-printing wheel having its shaft above and parallel with the shaft of the impression-roller, a screw to move the printing-wheel and its shaft longitudinally, and a lever to move the said wheel toward the impression-roller, as set forth.

17. In a workman's time-recorder, the combination with a clock and a revoluble impression-roller, of a horizontal shaft secured rigidly to said roller, a time-printing wheel connected to the clock, a frame for the printing-wheel adapted to move in two directions at right angles to each other, stationary supports, an oscillating frame mounted horizontally on said supports and adapted to engage the printing-wheel frame, and a lever to operate the oscillating frame, as set forth.

18. In a workman's time-recorder, the combination with a clock and a revoluble impression-roller, of a horizontal shaft secured rigidly to said roller, a time-printing wheel connected to the clock, a frame for the printing-wheel adapted to move in two directions at right angles to each other, stationary supports, an oscillating frame mounted horizontally on said supports and adapted to engage the printing-wheel frame, a curved lever fulcrumed on one of the stationary supports to engage the oscillating frame, a spring to retract the frame, a sliding piece on the roller-shaft, means to operate the same, and a lever pivoted intermediate its length to lugs projecting from the said stationary support, and connecting the said sliding piece with the curved lever, substantially as described and shown.

19. In a workman's time-recorder, the combination with a clock and a revoluble impression-roller, of a horizontal shaft secured rigidly to said roller, a time-printing wheel connected to the clock, a frame for the printing-wheel adapted to move in two directions at right angles to each other, stationary supports, an oscillating frame mounted horizontally on said supports and adapted to engage the printing-wheel frame, a curved lever fulcrumed between lugs on the upper end of the stationary support between the clock and the frame carrying the printing-wheel, to operate the oscillating frame to move the printing-wheel and its frame toward the said roller, a spring to retract the oscillating frame, a sliding collar on the roller-shaft, a plunger in the shaft to operate the collar, a lever on the end of the roller-shaft to operate the plunger, and a lever connecting the sliding collar with the curved lever, substantially as described and shown.

20. In a workman's time-recorder, the combination with the clock, of the impression-roller, a horizontal shaft fixed in the roller, time-printing wheels connected to the clock, a carriage for the printing-wheels movable toward and from the clock and toward and from the impression-roller, suitable means to move the carriage in the two directions, a dial on the front of the case of the recording mechanism, and a hand to traverse said dial connected to and operated by the carriage when the latter is moved toward and from the clock, as set forth.

21. In a workman's time-recorder, the combination with the clock, of the impression-roller, a horizontal shaft fixed in the roller, time-printing wheels connected to the clock, a carriage for the printing-wheels, movable toward and from the clock and toward and from the impression-roller, suitable means to move the carriage in the two directions, a dial on the front of the case of the recording mechanism, a hand to traverse said dial mounted on a spindle, a pulley on the spindle, a yoke for the spindle to turn in, a spring between the spindle and the yoke to retract the pulley, and a cord connecting the carriage with the pulley, as set forth.

22. In a workman's time-recorder, the combination with the record-receiving piece and its support, the clock, time-printing wheels connected to and rotated by one of the spindles of the clock, a carriage for the time-printing wheels movable in two directions at right angles to each other, an oscillating frame to move the carriage in one direction, and a threaded shaft to move the carriage in the other direction, a notched wheel on one of the time-wheels, a detent to arrest the movement of said notched wheel, a connection between the oscillating frame and the detent, a spring for the detent, inked-ribbon mechanism mounted on the carriage, and a rod operated by the oscillating frame to move the pawl of the ratchet-wheel of the inked-ribbon mechanism, substantially as described and shown.

23. In a workman's time-recorder, the combination with the record-receiving piece and its support, the clock, time-printing wheels connected to and rotated by one of the spindles of the clock, a carriage for the time-printing wheels movable in two directions at right angles to each other, an oscillating frame to move the carriage in one direction and a threaded shaft to move the carriage in the other direction, a notched wheel on one of the time-wheels, a detent to arrest the movement of said notched wheel, a connection between the oscillating frame and the detent, a spring for the detent, mechanism mounted on the carriage for moving and reversing the movement of the inked ribbon, a straight horizontal pawl for the ratchet-wheel of the inked-ribbon mechanism, a detent below the pawl and parallel with the same, and a vertically-movable rod sliding in the carriage-frame, engaging the said pawl, and operated by the oscillating frame, as and for the purpose described.

24. In a workman's time-recorder, the combination with the record-receiving piece and its support, the clock, time-printing wheels, connected to and rotated by one of the spindles of the clock, a carriage for the time-printing wheels movable in two directions at right angles to each other, an oscillating frame to move the carriage in one direction, and a threaded shaft to move the carriage in the other direction, a notched wheel on one of the time-wheels, a detent to arrest the movement of said notched wheel, a connection between the oscillating frame and the detent, a spring for the detent, mechanism mounted on the carriage for moving and reversing the movement of the inked ribbon, a straight horizontal spring-pawl for the ratchet-wheel of the inked-ribbon mechanism, a spring-detent below the pawl and parallel with the same engaging the said ratchet-wheel, a vertical longitudinally-movable rod connecting the said pawl with the oscillating frame, the hand connected to the carriage, and a system of levers to operate the oscillating frame, substantially as described and shown.

In testimony whereof we have hereunto signed our names.

JOHN DEY. [L. S.]
   ALEXANDER DEY. [L. S.]

Witnesses:
 WILLIAM DICKSON,
 ALEXANDER REID.